US009298465B2

(12) United States Patent
Bonanno et al.

(10) Patent No.: US 9,298,465 B2
(45) Date of Patent: Mar. 29, 2016

(54) ASYNCHRONOUS LOOKAHEAD HIERARCHICAL BRANCH PREDICTION

(75) Inventors: James J. Bonanno, Wappingers Falls, NY (US); Akash V. Giri, Austin, TX (US); Ulrich Mayer, Weil im Schoenbuch (DE); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 13/524,311

(22) Filed: Jun. 15, 2012

(65) Prior Publication Data

US 2013/0339695 A1    Dec. 19, 2013

(51) Int. Cl.
  *G06F 9/38*    (2006.01)
  *G06F 9/30*    (2006.01)
(52) U.S. Cl.
  CPC .......... *G06F 9/3806* (2013.01); *G06F 9/30047* (2013.01); *G06F 9/30145* (2013.01); *G06F 9/3808* (2013.01)
(58) Field of Classification Search
  USPC ........................................................ 712/238
  See application file for complete search history.

(56) References Cited

U.S. PATENT DOCUMENTS

| 5,163,140 | A | 11/1992 | Stiles et al. |
| 5,574,871 | A | 11/1996 | Hoyt et al. |
| 6,154,833 | A | 11/2000 | Murty et al. |
| 6,247,122 | B1 | 6/2001 | Henry et al. |
| 6,332,190 | B1 | 12/2001 | Hara |
| 6,539,458 | B2 * | 3/2003 | Holmberg ..................... 711/137 |
| 6,553,488 | B2 | 4/2003 | Yeh et al. |
| 6,560,693 | B1 | 5/2003 | Puzak et al. |
| 6,601,161 | B2 | 7/2003 | Rappoport et al. |
| 7,024,545 | B1 | 4/2006 | Zuraski, Jr. et al. |
| 7,082,520 | B2 | 7/2006 | Bonanno et al. |
| 7,120,784 | B2 | 10/2006 | Alexander et al. |
| 7,278,012 | B2 | 10/2007 | Sartorius et al. |
| 7,493,480 | B2 * | 2/2009 | Emma et al. .................. 712/240 |
| 7,533,252 | B2 | 5/2009 | Davis et al. |

(Continued)

OTHER PUBLICATIONS

Lee, et al., Branch Prediction Strategies and Branch Target Buffer Design, Computer, Jan. 1984, 17 pages.

(Continued)

*Primary Examiner* — Andrew Caldwell
*Assistant Examiner* — Michael Metzger
(74) *Attorney, Agent, or Firm* — Cantor Colburn LLP; Margaret McNamara

(57) ABSTRACT

Embodiments relate to asynchronous lookahead hierarchical branch prediction. An aspect includes a system for asynchronous lookahead hierarchical branch prediction. The system includes a first-level branch target buffer and a second-level branch target buffer coupled to a processing circuit. The processing circuit is configured to perform a method. The method includes receiving a search request to locate branch prediction information associated with a search address, and searching for an entry corresponding to the search request in the first-level branch target buffer. Based on failing to locate a matching entry in the first-level branch target buffer corresponding to the search request, a secondary search is initiated to locate entries in the second-level branch target buffer having a memory region corresponding to the search request. Based on locating the entries in the second-level branch target buffer, a bulk transfer of the entries is performed from the second-level branch target buffer.

7 Claims, 10 Drawing Sheets

(56) References Cited

U.S. PATENT DOCUMENTS

| | | | |
|---|---|---|---|
| 7,657,726 | B2 | 2/2010 | Emma et al. |
| 7,783,870 | B2 | 8/2010 | Levitan et al. |
| 7,831,817 | B2 | 11/2010 | Biles |
| 8,166,345 | B2 | 4/2012 | Abou-Emara et al. |
| 2004/0015683 | A1 | 1/2004 | Emma et al. |
| 2008/0120496 | A1 | 5/2008 | Bradford et al. |
| 2009/0217017 | A1 | 8/2009 | Alexander et al. |
| 2010/0017586 | A1 | 1/2010 | Gelman et al. |
| 2010/0058038 | A1 | 3/2010 | Wang |
| 2011/0153945 | A1 | 6/2011 | Kim et al. |
| 2012/0042155 | A1 | 2/2012 | Rychlik |
| 2013/0339695 | A1 | 12/2013 | Bonanno et al. |
| 2014/0019738 | A1 | 1/2014 | Kataoka et al. |

OTHER PUBLICATIONS

McFarling, Combining Branch Predictors, Technical Report TN-36m, Digital Western Research Laboratory, Jun. 1993, 29 pages.

Pan, et al., Correlation-Based Branch Target Buffer Design, http://www.ip.com/pubview/IPCOM000104329D, Mar. 19, 2005, 5 pages.

Jimenez, Delay-Sensitive Branch Predictors for Future Technologies, PhD Thesis, University of Texas at Austin, Jan. 2002, 165 pages.

Calder, et al., Next Cache Line and Set Prediction, Proceedings of 22nd Annual Intern'l Symposium on Computer Architecture, ACM, 1995, 10 pages.

Burcea, et al., Phantom-BTB: A Virtualized Branch Target Buffer Design, ASPLOS '09, Washington, DC, Mar. 7-11, 2009, 11 pages.

Anonymous, Power and Performance Improvements Using a Selective Branch Target Buffer Entry Replacement, http://www.ip.com/pubview/IPCOM146501D; Feb. 13, 2007, 4 pages.

IBM TDB (Mar. 2004). Pre-thread Valid Bits for Multi-threaded Effective to Real Address Translation (ERATs). IPCOM000022179D.

(Sep. 2005) Method for Increasing Target Density in a BTB. IPCOM000128938D.

Gonclaves, et al, "Evaluating the effects of branch prediction accuracy on the performance of SMT architectures," Proceedings of Ninth Euromicro Workshop on Parallel and Distributed Processing, Feb. 2001, pp. 1-9.

Hily and Seznec, "Branch Prediction and Simultaneous Multithreading," Proceedings of the 1996 Conference on Parallel Architectures and Compilation Techniques, Mar. 1996, pp. 1-10.

A. Seznec, "The L-TAGE Branch predictor," Journal of Instruction Level Parallelism 9, May 2007, pp. 1-13.

Tullsen, et al, "Simultaneous Multithreading: Maximizing On-Chip Parallelism," Proceedings of the 22rd Annual International Symposium on Computer Architecture, Jun. 1995, pp. 1-12.

* cited by examiner

ASYNCHRONOUS LOOKAHEAD HIERARCHICAL BRANCH PREDICTION

BACKGROUND

The present invention relates generally to computer processing systems, and more specifically, hierarchical branch prediction incorporating two or more levels of branch target buffers.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a system for asynchronous lookahead hierarchical branch prediction using a second-level branch target buffer. The system includes a first-level branch target buffer and a second-level branch target buffer coupled to a processing circuit. The processing circuit is configured to perform a method. The method includes receiving a search request to locate branch prediction information associated with a search address, and searching for an entry corresponding to the search request in the first-level branch target buffer. Based on failing to locate a matching entry in the first-level branch target buffer corresponding to the search request, a secondary search is initiated to locate entries in the second-level branch target buffer having a memory region corresponding to the search request. Based on locating the entries in the second-level branch target buffer, a bulk transfer of the entries is performed from the second-level branch target buffer.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
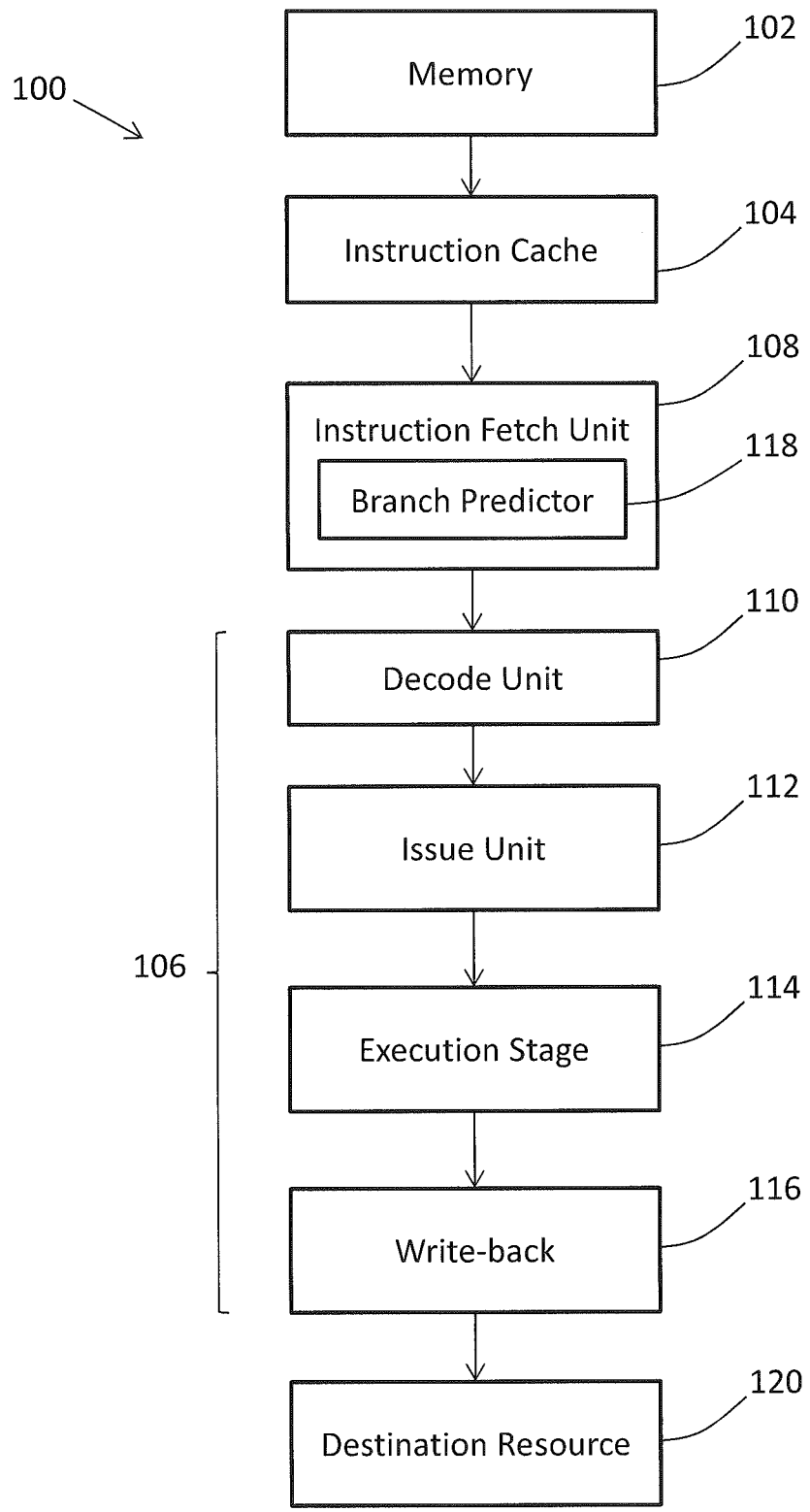
FIG. 1 depicts a processing system according to an embodiment.

Exemplary embodiments provide asynchronous lookahead hierarchical branch prediction using a second-level branch target buffer. A branch predictor can include a branch target buffer (BTB) structure and a number of structures and buffers to support branch prediction and branch target prediction. The BTB can be searched in parallel to and independently from instruction fetching to find upcoming branches, in which case it is called asynchronous lookahead branch prediction. Alternatively, it can be accessed simultaneously with or after fetching instructions and determining instruction boundaries in order to provide a prediction for each encountered branch instruction, in which case it is called synchronous branch prediction. In either case performance benefits of the BTB are a function of the accuracy of the prediction provided from the BTB, a function of the capacity of the BTB, and the latency required to access the BTB.

A larger BTB typically provides better prediction accuracy than a smaller BTB because it can store information about more branch instructions; however, a larger BTB typically has a longer latency than a smaller BTB. A large BTB may be implemented with one or more large static random access memory (SRAM) arrays. Such large SRAM arrays often have a limited number of read and write ports (e.g., only 1 or 2) and have restrictions such that it may not be possible to both read and write to the same bank of the SRAM array in the same cycle. A small BTB can be implemented with one or more small SRAM register files. SRAM register files are often much more flexible in providing multiple read and write ports. However, multi-ported register files are often less dense than SRAM arrays, making multi-ported register files infeasible to implement a sufficiently large BTB to provide adequate performance, especially in commercial workloads with large instruction (and therefore branch) footprints.

In exemplary embodiments, a BTB structure includes multiple levels, such as a first level BTB (BTB1), a slower but larger second-level BTB (BTB2), and a faster but smaller branch target buffer preload table (BTBP). The BTBP is a small BTB that is searched in parallel with a larger main BTB (BTB1) to predict branch instructions' targets, and optionally direction. The BTB2 can be larger (and potentially slower) than the BTB1. Because the BTB1 and BTB2 are large, they can be implemented with large SRAM arrays which have a limited number of read and write ports. However, since the BTBP is much smaller than the BTB1, it can be implemented with SRAM register files. The BTBP may have many read and write ports that can be used simultaneously. In an alternate embodiment, the BTBP, at the cost of decreasing branch prediction efficiency, is omitted as an intermediate structure between the BTB1 and the BTB2.

Two level BTBs typically support parallel lookups such that synchronous accesses of the first and second-level can be made to determine if BTB2 was successful in locating a matching entry if BTB1 was unsuccessful. When complex software applications switch between multiple modules, for example modules A, B, and C, BTB1 may hold branch predictions for a currently executing module (module A in this example) while the larger BTB2 holds branch predictions for all modules (A, B, C). When switching between modules, such from module A to module B, BTB1 will experience a number of misses, which could result in repeatedly making a number of higher latency lookups for all predictions from BTB2. In exemplary embodiments, the BTB2 operates asynchronously relative to BTB1 as a lookahead buffer. Logic searches the BTB2 for branch prediction information related to a memory region, e.g., one 4K page, and transfers all matching predictions into the BTBP or BTB1. When the BTBP is used as an intermediate structure, predictions can be subsequently transferred from the BTBP to the BTB1 after a hit or match is detected in the BTBP as part of the branch prediction search process. Logic may be triggered when the BTB1 encounters a pattern of no prediction in the BTB1, i.e., a BTB1 miss. In embodiments, the logic detects that the BTB1 may be lacking predictions and speculatively bulk transfers branch prediction information from the BTB2 for the memory region that the branch prediction is currently operating upon rather than making branch predictions directly from the BTB2.

A further aspect prioritizes BTB2 predictions which are likely to be used earlier than others. Exemplary embodiments provide a balance between the amount of data needed to determine the priority and the benefit for a successful prediction rate.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes a branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement asynchronous lookahead hierarchical branch prediction using a second-level branch target buffer.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
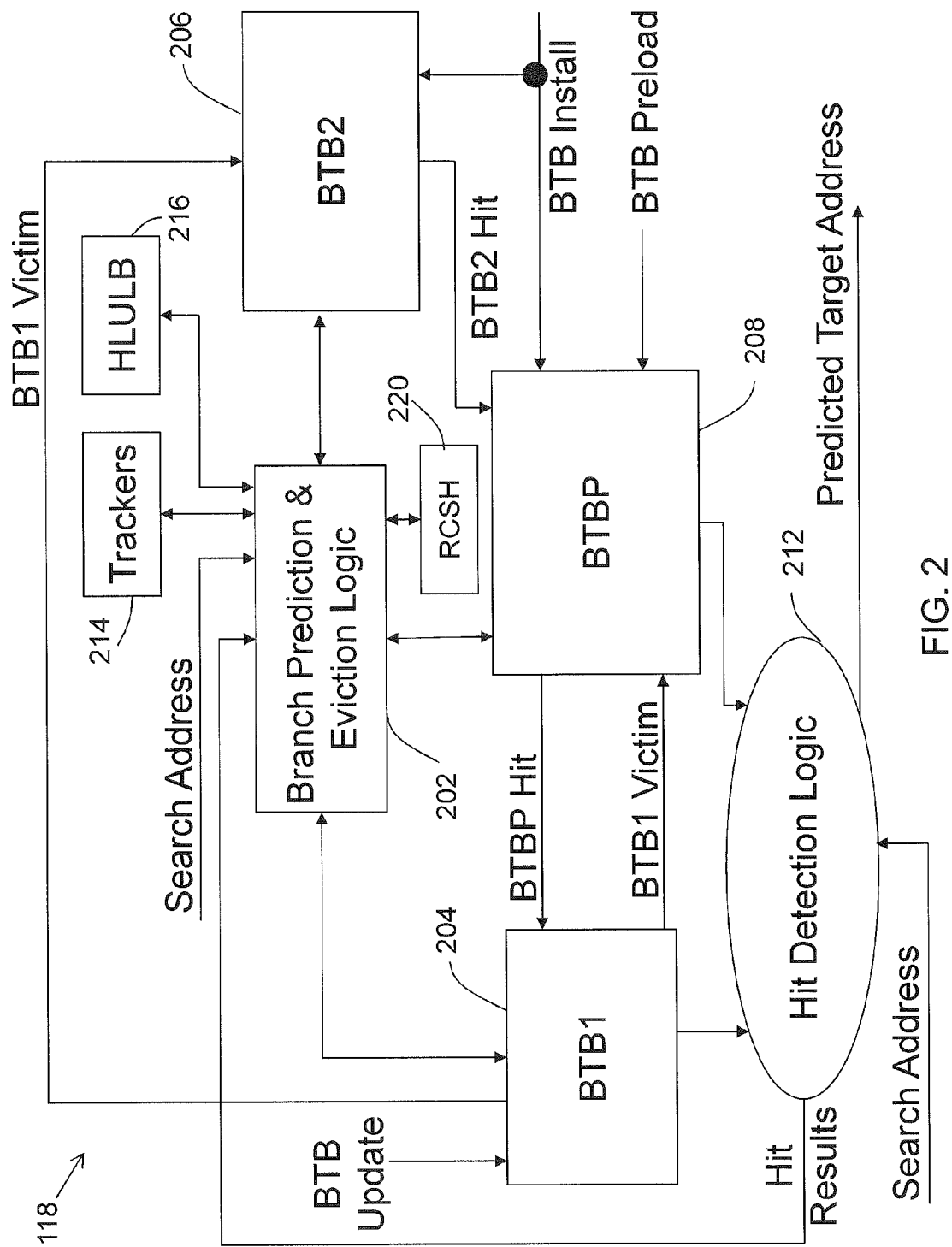
FIG. 2 depicts a branch predictor according to an embodiment.

FIG. 2 depicts an example of the branch predictor 118 of FIG. 1 in greater detail. The example branch predictor 118 of FIG. 2 includes branch prediction and eviction logic 202, BTB1 204, BTB2 206, BTBP 208, and hit detection logic 212. The branch prediction and eviction logic 202 can control access and updates of BTB entries in the BTB1 204, BTB2 206, and BTBP 208, as well as movement of BTB entries between the BTB1 204, BTB2 206, and BTBP 208. In an exemplary embodiment, BTB1 204 is a primary or first-level BTB and BTB2 206 is a secondary or second-level BTB. BTBP 208 is configured as a filter for BTB entries installed in the BTB1 204. BTB installs are performed through the BTBP 208 and BTB2 206, with BTB entries moving from the BTBP 208 to the BTB1 204 when hit detection logic 212 detects a hit or match from BTBP 208 data corresponding to a search request. When hit detection logic 212 has a BTB1 miss as a search result, the branch prediction and eviction logic 202 can, upon confirmation, trigger a secondary search of the BTB2 206 for BTB entries within a same memory region for asynchronous transfer from the BTB2 206 to the BTBP 208. Secondary searches of the BTB2 206 are managed using trackers 214. A half lines used lookaside buffer (HLULB) 216 can be used to prioritize transfers from the BTB2 206. The HLULB 216 can be a separate side structure and may also be used to support the instruction cache 104 of FIG. 1. Recently completed search history (RCSH) 220 can be used to track a list of recently completed searches of the BTB2 206 and limit creation of new entries in the trackers 214. While the branch prediction and eviction logic 202 and the hit detection logic 212 are depicted separately, it will be understood that they can be combined into a single logic block or further subdivided.

Figure 3:
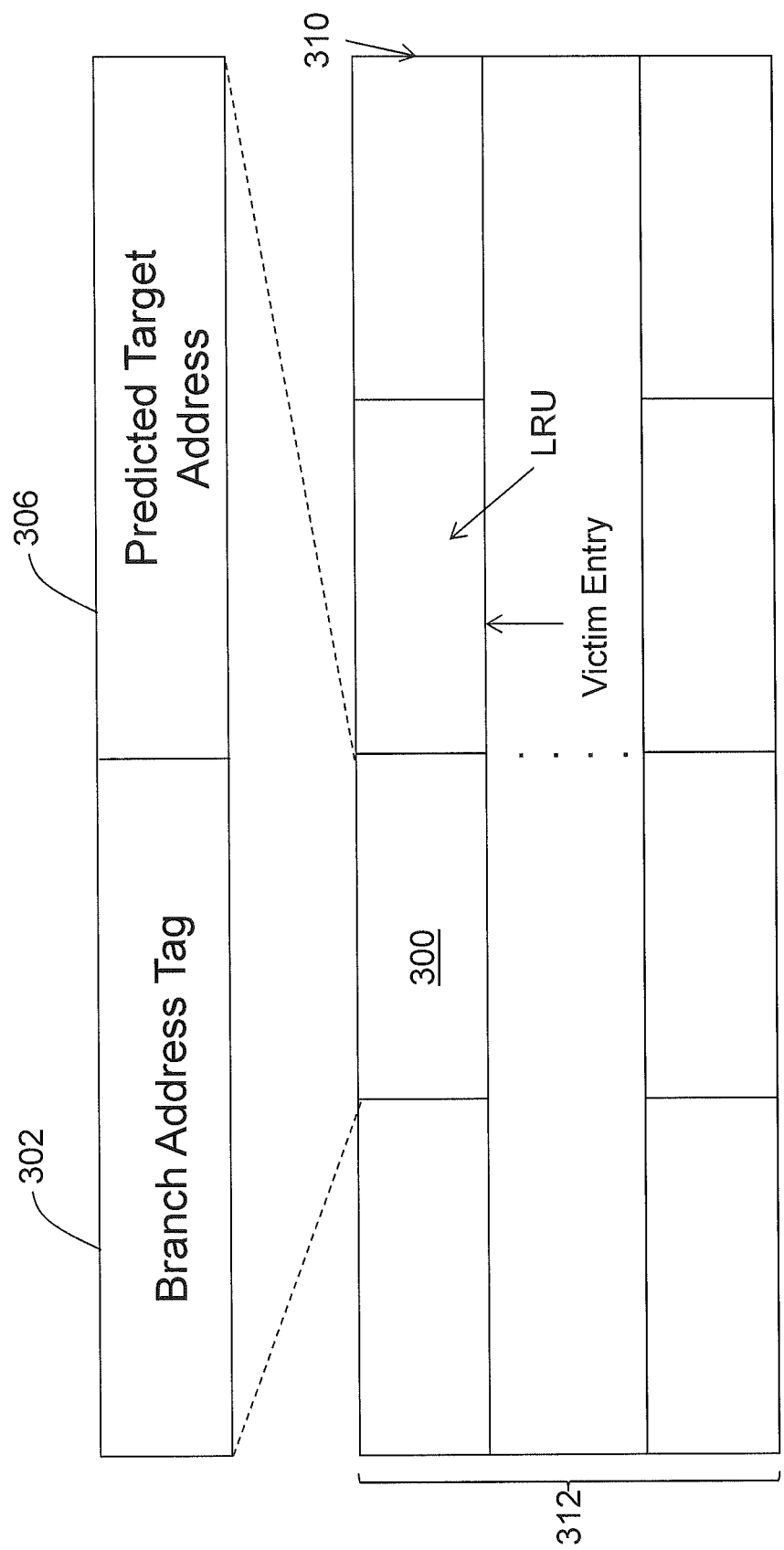
FIG. 3 depicts a branch target buffer entry according to an embodiment.

Each of the BTB1 204, BTB2 206, and the BTBP 208 is set associative, including multiple sets of BTB entries. The BTBP 208 is a cache of branch prediction information similar to BTB1 204. The BTB2 206 is a higher level cache of branch prediction information. A capacity of the BTBP 208 to store entries is less than a capacity of the BTB1 204 to store entries, and a capacity of the BTB2 206 is greater than the capacity of the BTB1 204 to store entries. A generic example of a BTB entry is depicted in FIG. 3 as BTB entry 300 (also referred to as entry 300), which includes a branch address tag 302 and a predicted target address 306. With continued reference to FIGS. 1-3, the branch address tag 302 is used to locate an entry within a BTB row 310, where each of the BTB1 204, BTB2 206, and BTBP 208 of FIG. 2 can include multiple BTB rows 312 and multiple set associative BTB entries per BTB row 310. The BTB1 204, BTB2 206, and BTBP 208 can have different numbers of BTB rows 312 and columns relative to each other. A least recently used (LRU) identifier can also be tracked to assist in determining which BTB entry 300 was least recently used. Additional tracking information can include a victim entry identifier that identifies which BTB entry 300 to overwrite when a new BTB entry 300 is installed. The victim entry and LRU identifiers may be tracked separately depending on an entry install/replacement algorithm used to populate BTB entries 300. Each BTB entry 300 can include other branch prediction information (not depicted), such as a branch direction to indicate whether the associated branch was taken or not taken.

A search address to access the branch predictor 118 and predict a branch target address is a function of an initial address used by the instruction fetch unit 108 of FIG. 1. When looking for branch predictions, both the BTB1 204 and BTBP 208 are read. Either one can provide a branch prediction if it contains an entry with a branch address tag 302 matching the search address. The BTBP 208 and the BTB1 204 both provide input to hit detection logic 212 to determine whether a match or "hit" is located based on the search address. If a match is found, the hit detection logic 212 outputs a predicted target address. If the match was from the BTBP 208, a corresponding matching entry can installed to the BTB1 204 as a BTBP hit to overwrite a victim entry in the BTB1 204, such that the most recent and relevant branch target predictions are maintained in the BTB1 204.

The BTBP 208 supports multiple install sources. Examples of install sources include: a surprise BTB install, a software preload install, a BTB install from another branch target buffer, and a victim install from the BTB1 204. A surprise branch is a branch instruction that was not predicted by the hit detection logic 212. Surprise branches that qualify for being included in the branch predictor 118 (for example, resolved taken branches), are installed (written) into the BTBP 208 and can also be written into BTB2 206 as a BTB install in the example of FIG. 2.

Another install source is a software preload install, which can be received from an architected preload instruction. In the example of FIG. 2, software preload installs are received as BTB preloads in the BTBP 208. Another install source can be from searching another level of a hierarchical BTB configuration, such as a BTB2 hit from BTB2 206. As previously described, a further install source is a victim install from the BTB1 204. In the example of FIG. 2, victim installs from the BTB1 204 are received at the BTBP 208 and may also be received at the BTB2 206. Many different install sources may be implemented together to install branch prediction information into the BTBP 208 and in the BTB2 206. In any particular cycle multiple surprise branch installs and multiple preloads can be generated simultaneously. The BTBP 208 may be implemented as a small SRAM, and therefore, the BTBP 208 can be sized to provide enough write ports to support a maximum rate of incoming write requests.

When a branch completes and it is determined that prediction information provided by the BTB1 204 was wrong, a BTB update can be performed to the BTB1 204. For example, the BTB1 204 may also include prediction direction and strength information, such as strong not taken, weak not taken, weak taken, strong taken associated with each BTB entry 300. In an exemplary embodiment, BTB updates for prediction direction and strength are made to the BTB1 204 but are not made to the BTBP 208. Therefore, the BTB1 204 can act as a branch history table but the BTBP 208 may not be an accurate branch history table even though it can also hold prediction direction and strength information.

Transferring of BTB entries from the BTB2 206 to the BTBP 208 is performed in blocks, e.g., 4 kilobyte pages. Each bulk transfer moves a number of entries as sub-blocks and takes place over multiple cycles. Transfers of blocks are performed asynchronously with respect to searching of the BTB1 204 and BTBP 208. A confirmed or suspected miss of branch prediction in the BTB1 204 and BTBP 208 triggers searching in the BTB2 206. Detecting a surprise branch instruction at various stages of the pipeline past decode could trigger searching the BTB2 206. In an asynchronous lookahead level 1 branch predictor where the BTB1 204 and BTBP 208 are accessed asynchronously from instruction fetching and decode, based on failing to locate a matching entry in the BTB1 204 and BTBP 208 corresponding to a search request, a BTB1 miss can trigger BTB2 action if a predetermined number of searches have been unsuccessful since one or more of: a previous prediction, a surprise branch, and a restart of the search process. For example, after 3 unsuccessful searches in the BTB1 204 and BTBP 208, a secondary search of the BTB2 206 can be initiated using the search address which triggered the miss as a region for performing bulk transfers from the BTB2 206. Upon successfully completing a search of the BTB2 206, an entry can be recorded in the RCSH 220.

Trackers 214 can track transfers for multiple blocks of BTB entries such that several block transfers can be active at the same time. The trackers 214 can include addresses of BTB 204 misses that triggered a bulk transfer, tracker validity status, and other information. When a BTB miss is detected and confirmed, prior to creating a new tracker in the trackers 214 for a new secondary search, the RCSH 220 can be checked to confirm that the new secondary search does not match one of the recently completed searches. Also prior to creating the new tracker for the new secondary search, other tracker entries in the trackers 214 can be checked to confirm that the new secondary search does not match an active secondary search. Once a new tracker in the trackers 214 is activated for a secondary search, search results in the form of BTB2 206 entries are transferred back to the BTBP 208 as a sequence of sub-blocks. The sub-blocks can be transferred in sequential order (e.g., "left-to-right"), or they can be transferred in a prioritized order clustered around the miss address, or the HLULB 216 can be used to prioritize transfers from the BTB2 206. Since transferring blocks of BTB entries takes multiple cycles, controlling the order in which the data is transferred can improve the chances that BTB entries needed for predictions in the near term will be available when predicted. Further details about the HLULB 216 are provided in reference to FIGS. 5, 6, and 8.

Figure 4:
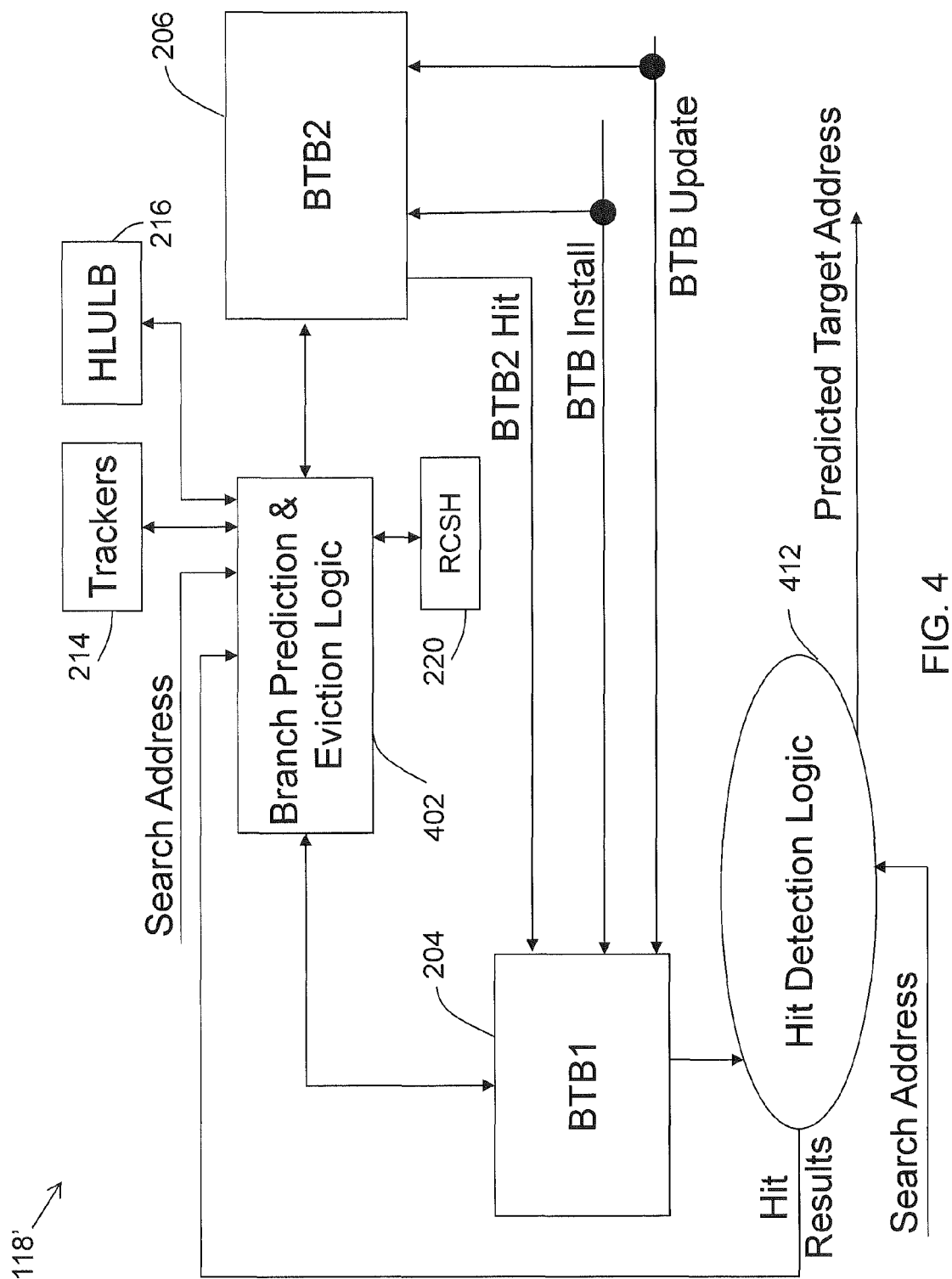
FIG. 4 depicts a branch predictor according to an alternate embodiment.

FIG. 4 depicts an alternate embodiment of the branch predictor 118 of FIG. 1 as branch predictor 118'. Similar to the embodiment of the branch predictor 118 depicted in FIG. 2, the branch predictor 118' of FIG. 4 includes BTB1 204, BTB2 206, trackers 214, and RCSH 220. The branch predictor 118' also has access to the HLULB 216, which may be implemented as a separate side structure. Branch prediction and eviction logic 402 is similar to the branch prediction and eviction logic 202 of FIG. 2 except that the branch prediction and eviction logic 402 does not support a BTBP. The removal of the BTBP allows for a reduced design (e.g. complexity, area and cycle time) at the trade-off of reducing the efficiency of the BTB1 204. The BTB1 204 efficiency is reduced as a higher rate of speculative branches, as transferred from the BTB2 206, are placed in the BTB1 204 which are never used. These speculative branches replace a subset of useful branches in the BTB1 204 which would have been used to acquire higher hit rates thus acquiring higher processor performance. Hit detection logic 412 is also similar to hit detection logic 212 of FIG. 2 except that the hit detection logic 412 does not support a BTBP. As can be seen in FIG. 4, transfers from BTB2 206 are made directly to BTB1 204 without using a BTBP as an intermediary/filtering structure. Like numbered structures of FIG. 4 function in like manner as previously described in reference to FIG. 2 and as further described herein.

Figure 5:
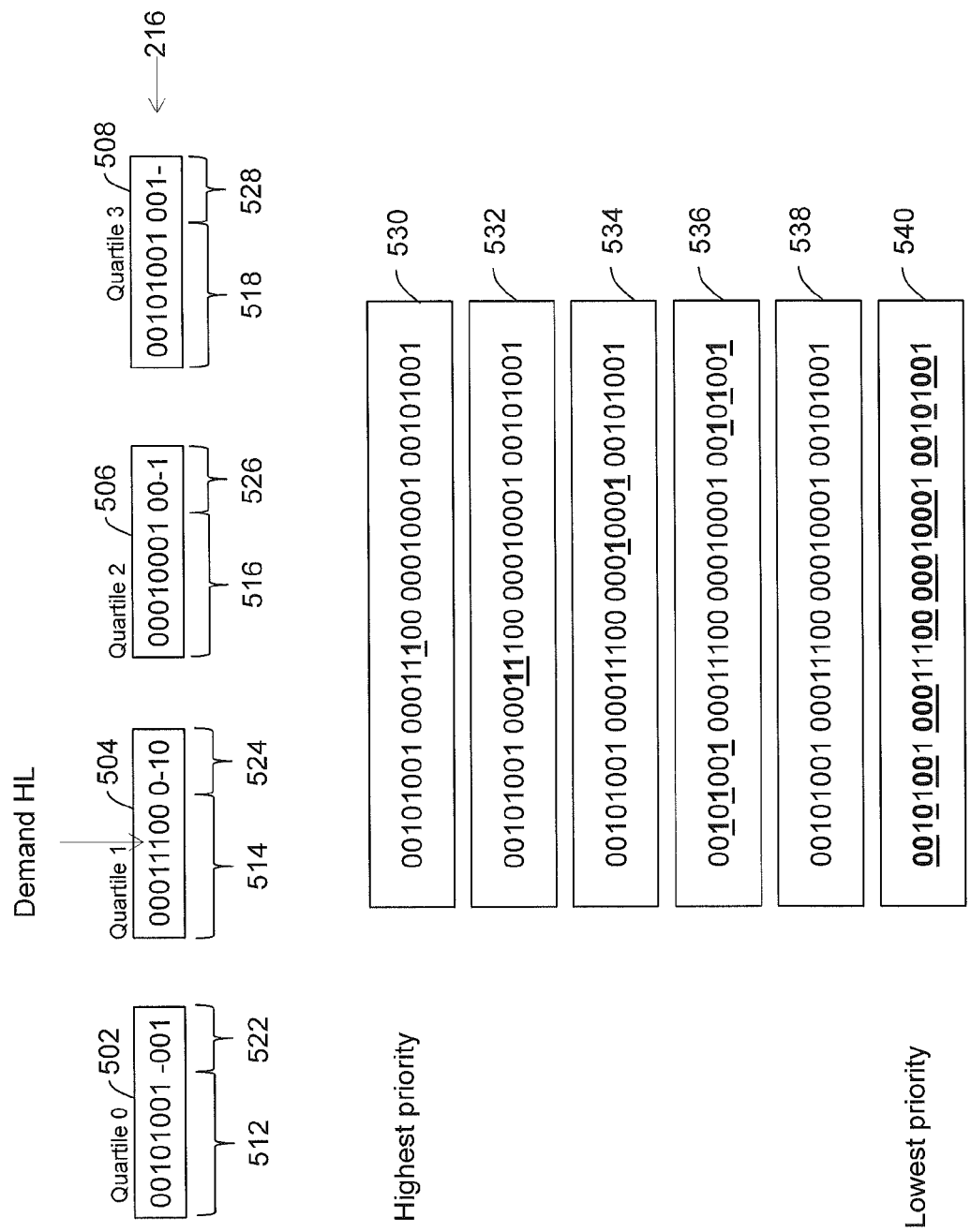
FIG. 5 depicts transfer priorities across multiple memory sections according to an embodiment.

FIG. 5 depicts transfer priorities across multiple memory sections using the HLULB 216 of FIGS. 2 and 4. In the example of FIG. 5, it is assumed that a block or page is 4 kilobytes, segments of each block include 4 quartiles, and sub-blocks have an instruction cache half line, e.g., 128 byte, granularity. Other sizes are contemplated within the scope of the disclosure. In this example, priorities are the same for all branches within a half line. In exemplary embodiments, the HLULB 216 collects information about a program execution path indicating which half lines were referenced and not referenced. The HLULB 216 can be a side structure that supports prefetching for the instruction cache 104 of FIG. 1, but is also leveraged to prioritize data transfers from the BTB2 206 to the BTBP 208 or to the BTB1 204. In an embodiment, the HLULB 216 includes one bit per half line (HL) per tracked page, which indicates that code from that HL has been executed. For each of the most recent pages, the usage of each half line is put into the HLULB 216. Once a bulk transfer is triggered from the BTB2 206, the referenced half lines get higher priority than the non-referenced half lines such that the referenced half lines get transferred first.

In the example described herein, the HLULB 216 includes 32 half line bits per 4K page entry (128 bytes*32=4 kilobytes). For even finer granularity, each page is divided in 4 1 kilobyte segments (quartiles). The HLULB 216 does not grow in size; rather, it tracks 4 times 8 half lines per page separately. The priorities of half line based prediction information can be set, for example, as noted in Table 1.

TABLE 1

Example priorities for half line transfer order

| Priority | Half Lines to Transfer |
|---|---|
| 1 (highest priority) | Demand HL |
| 2 | Referenced HLs in the same (demand) quartile |
| 3 | Referenced HLs in the other three quartiles of the page |
| 4 | HLs for pages with no HLULB information available |
| 5 (lowest priority) | Unreferenced HLs |

According to Table 1, the highest priority transfer is the Demand HL (or demand sub-block), which is the half line that the BTB1 204 look-up misses and triggers the bulk transfer from the BTB2 206. The next highest priority is referenced half lines, e.g., half lines recently accessed by the instruction cache 104 of FIG. 1 in the same quartile (1 KB segment) as the Demand HL. This assumes that code which is closer in address range to the Demand HL is more likely to be accessed in close time proximity to the Demand HL. The next lower priority in this example is referenced HLs in the other three quartiles of the page. The next lower priority is HLs for pages with no HLULB information available. For example, a page may not have been accessed recently enough to have HLULB 216 data available. The lowest priority in Table 1 is for unreferenced HLs. Whether HLs are referenced or unreferenced can be determined through the HLULB 216.

A further extension to the priorities is the addition of tracking bits indicating transition flow between referenced quartiles as tracked by the HLULB 216. For example, the HLULB 216 can be extended with referenced quartile (segment) information indicating that code in one quartile branched into one or more other quartiles. Three bits can be used for quartile reference tracking to support 4 quartiles, since each quartile need not separately track references to itself. Table 2 is an example of a priority table where referenced quartiles are also tracked for priority.

TABLE 2

Example priorities for half line transfer order with referenced quartiles

| Priority | Half Lines to Transfer |
|---|---|
| 1 (highest priority) | Demand HL |
| 2 | Referenced HLs in the same (demand) quartile |
| 3 | Referenced HLs in referenced quartiles of the page |
| 4 | Referenced HLs in unreferenced quartiles of the page |
| 5 | HLs for pages with no HLULB information available |
| 6 (lowest priority) | Unreferenced HLs |

As described, the HLULB 216 is used to steer the order of the transfers of branch prediction information from the BTB2 208 into the BTBP 206 or the BTB1 204. Without the steering, the whole page (32 HLs) can be transferred sequentially in order. Using the HLULB 216, prediction information in HLs which are more likely to be needed early is transferred first due to demand and closer reference proximity to the demand. Within each priority level, the transfer may follow a sequential approach, e.g., left-to-right, or an approach that fans away from the demand half line, e.g. (left-right-left-right- . . . ).

FIG. 5 depicts example of HLs in quartiles for a 6-level prioritization as described in Table 2. In FIG. 5, HLULB 216 is depicted as providing reference information for four quartiles that map to a particular page of the BTB2 206. Quartiles 502, 504, 506, and 508 each include an 8-bit referenced half line field 512, 514, 516, 518, and a 3-bit referenced quartile field 522, 524, 526, 528. Each bit position in the referenced half line fields 512-518 corresponds to a 128 byte half line of a page, where a '1' indicates that a particular half line was referenced and a '0' indicates that a particular half line was not referenced. The referenced quartile fields 522-528 indicate that a particular quartile branched to another quartile. The 3-bits of each referenced quartile field 522-528 covers 4 possible positions, where a '-' indicates that a bit position is not used to avoid self-referencing. For example, quartile 502 can be viewed as being at position 0, quartile 504 is at position 1, quartile 506 is at position 2, and quartile 508 is at position 3. The referenced quartile fields 522 with a value of "-001" indicates a reference from quartile 502 to quartile 508 (position 3). Similarly, the referenced quartile field 524 with a value of "0-10" indicates a reference from quartile 504 to quartile 506 (position 2). The referenced quartile field 526 with a value of "00-1" indicates a reference from quartile 506 to quartile 508 (position 3). The referenced quartile field 528 with a value of "001-" indicates a reference from quartile 508 to quartile 506 (position 2).

In the example of FIG. 5, a Demand HL pointer identifies a particular HL as the demand sub-block that initiated the secondary search (e.g., HL for search address of BTB1 204 miss). FIG. 5 also illustrates an example of six priority levels 530-540, where HLs (sub-blocks) selected for transfer at each priority level appear as boldface and underlined HLs. In the example, referenced half line field 512="00101001", referenced half line field 514="00011100", referenced half line field 516="00010001", and referenced half line field 518="00101001". According to the priority example of Table 2, the Demand HL of quartile 504 is transferred in a highest priority level 530, and referenced HLs (values of '1') in quartile 504 (same quartile as the Demand HL) are transferred in the second highest priority level 532. Since quartile 504 references quartile 506, the third highest priority level 534 transfers referenced HLs (values of '1') in quartile 506. The fourth highest priority level 536 transfers referenced HLs (values of '1') in unreferenced quartiles 502 and 508. The fifth highest priority level 538 would transfer HLs with no available reference information; however, since reference information is known for this page through the HLULB 216, no transfers occur for the fifth highest priority level 538. The lowest priority level 540 transfers unreferenced HLs having a value of '0' across quartiles 502-508.

Figure 6:
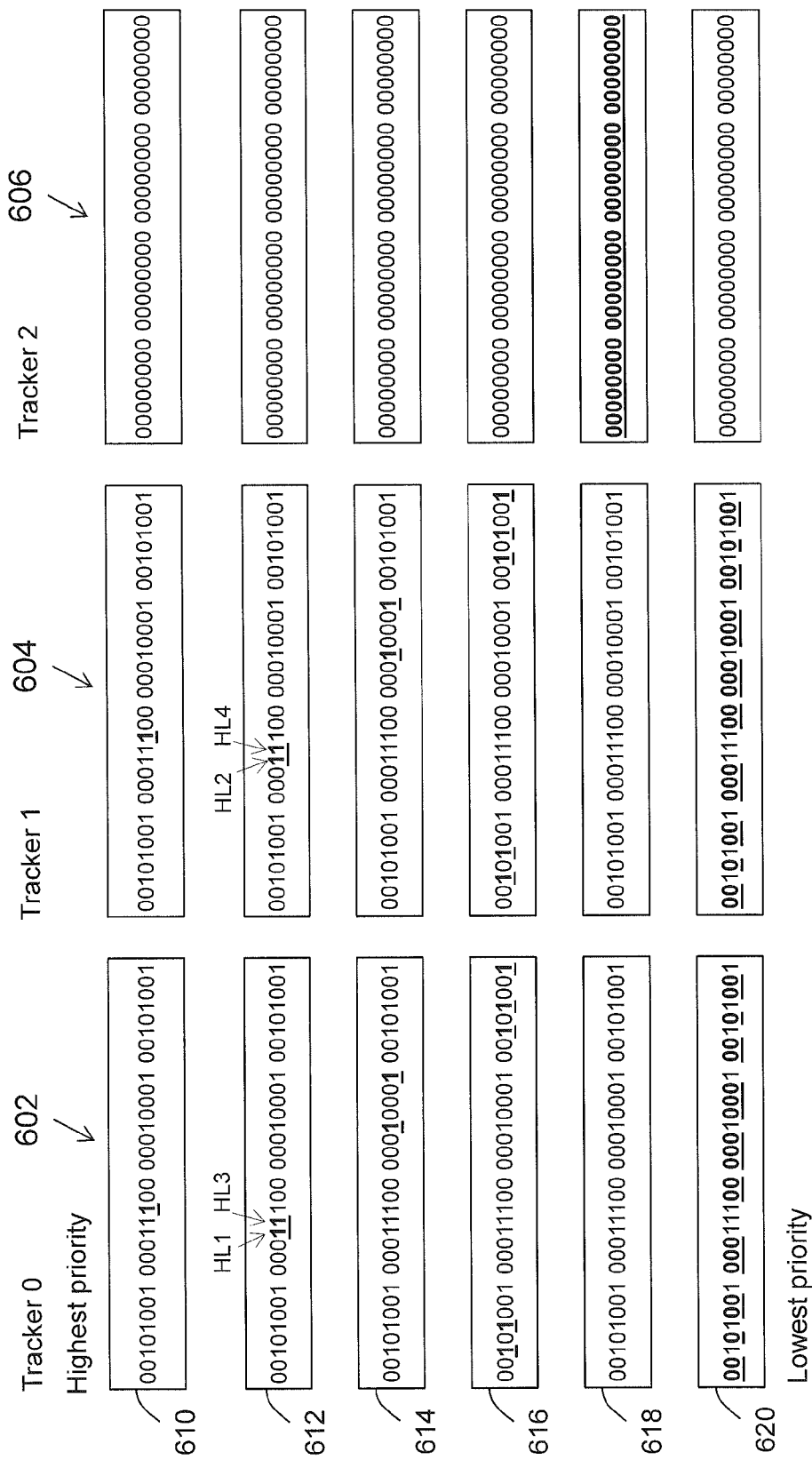
FIG. 6 depicts transfer priorities across multiple trackers according to an embodiment.

When multiple trackers 214 of FIGS. 2 and 4 are active, they can track multiple independent 4K regions at the same time. When entries from different trackers 214 have equal priority, the different trackers 214 may be scheduled round robin, i.e. within a tracker left-to-right transfer sequence, but the transfers of the different trackers 214 are interleaved. An example of multiple active trackers 214 is depicted in FIG. 6. In the example of FIG. 6, tracker 602 and tracker 604 have the same HLULB data and the same Demand HL (which may be unlikely in practice) and tracker 606 does not have HLULB data available. Similar to FIG. 5, referenced HLs are depicted as '1's and non-referenced HLs are depicted as '0's for trackers 602 and 604. HLs selected for transfer per priority level are depicted in boldface and underlined for priority levels 610 (highest priority), 612, 614, 616, 618, and 620 (lowest priority).

When trackers at the same priority level have HLs to transfer, a round robin approach can be applied. For example, tracker 602 is at position 0 and tracker 604 is at position 1 in the example sequence. For the second highest priority level 612, tracker 602 indicates 2 HLs to transfer and tracker 604 also indicates 2 HLs to transfer. In this example for the second highest priority level 612, the leftmost selected HL (HL1) of tracker 602 is transferred first, followed by the leftmost selected HL (HL2) of tracker 604, followed by the next selected HL (HL3) of tracker 602, followed by the next selected HL (HL4) of tracker 604. At the fifth highest priority level 618, since tracker 606 did not hit in the HLULB 216, all HLs of tracker 606 get the same fifth priority.

Figure 7:
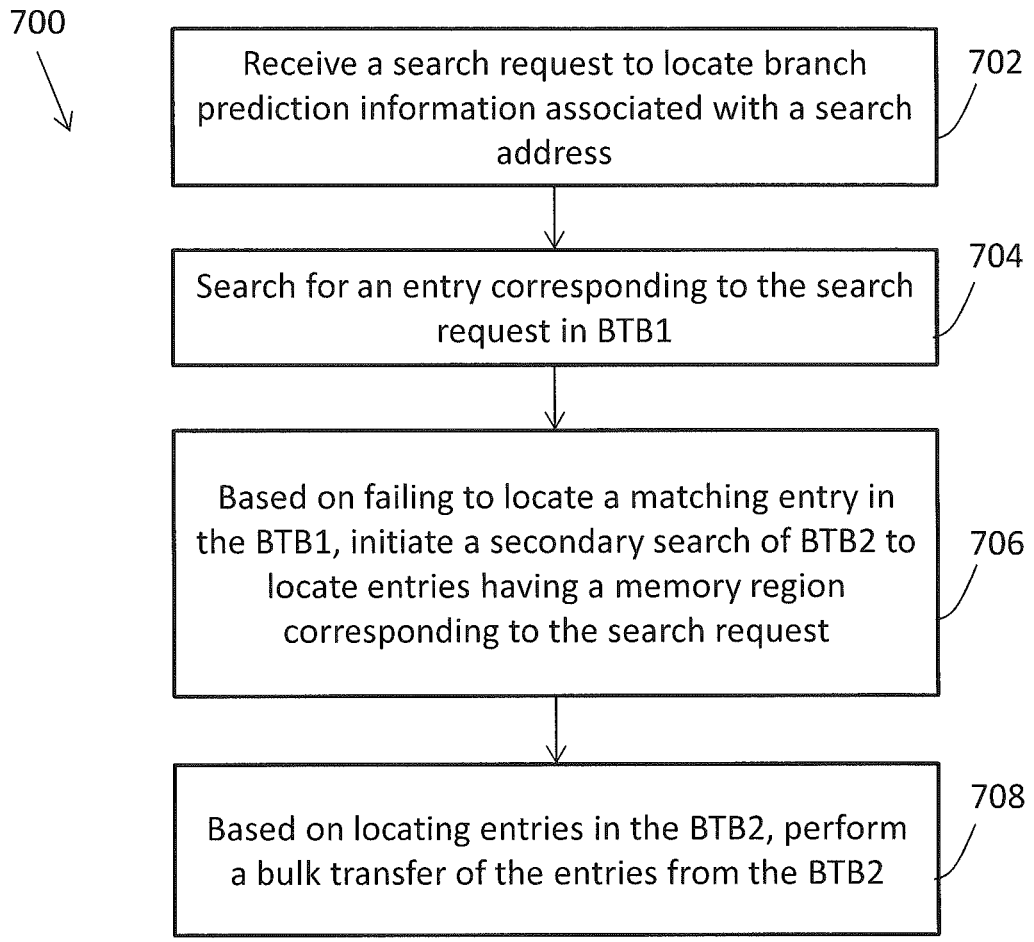
FIG. 7 is a flowchart illustrating a process for asynchronous lookahead hierarchical branch prediction using a second-level branch target buffer according to an embodiment.

Turning now to FIG. 7, a process 700 for asynchronous lookahead hierarchical branch prediction using a second-level branch target buffer will now be described in an exemplary embodiment. The process 700 is described in reference to FIGS. 1-4 and can be implemented by the branch predictor 118 of FIG. 2 and/or the branch predictor 118' of FIG. 4.

At block 702, the branch predictor 118 receives a search request to locate branch prediction information. The search request can include a search address for the branch prediction and eviction logic 202 used to index into the BTB1 204 and BTBP 208. For branch predictor 118', the branch prediction and eviction logic 402 indexes into the BTB1 204. At block 704, the branch prediction and eviction logic 202 searches for an entry corresponding to the search request in the BTB1 204 and BTBP 208. The search may be performed by passing a BTB row 310 of the BTB1 204 and BTBP 208, as indexed by the search address, to the hit detection logic 212 to compare branch address tags 302 of BTB entries 300 relative to bits of the search address and identify a matching entry or a "hit". Alternatively, a pair of BTB entries 300 from the BTB1 204 and BTBP 208 can be passed to the hit detection logic 212 for comparison. Hit results of the hit detection logic 212 are returned to the branch prediction and eviction logic 202. For branch prediction and eviction logic 402, searching for a BTB hit or miss is performed for the BTB1 204.

At block 706, based on failing to locate a matching entry in the BTB1 204 corresponding to the search request, a secondary search is initiated to locate entries in the BTB2 206 having a memory region corresponding to the search request. Failing to locate the matching entry in the BTB1 204 may be subject to confirmation, such as failing for a predetermined number (e.g., 3) of searches since one or more of: a previous prediction, a surprise branch, and a restart. As a further example, searching of the BTB1 204 may be performed over a 96 byte address range, and upon failing to locate the matching entry within the 96 byte address range, a BTB miss at the same page address (e.g., a 4 kilobyte block) is identified for speculative bulk transfer.

At block 708, based on locating the entries in the BTB2 206, a bulk transfer of the entries from the BTB2 206 is performed. The bulk transfer can return the entries from the BTB2 206 to the BTB1 204 or the BTBP 208. Trackers 214 can be used to manage the secondary search and control the bulk transfer. A recently completed search history including a list of recently completed searches of the BTB2 206 can be maintained in the RCSH 220. Prior to creating a new tracker in the trackers 214 for a new secondary search, the RCSH 220 can be checked to confirm that the new secondary search does not match one of the recently completed searches. Additionally, prior to creating a new tracker for a new secondary search, other tracker entries in the trackers 214 can be checked to confirm that the new secondary search does not match an active secondary search. When transferring sub-blocks from the BTB2 206, prioritization can be used to establish a sequence of transferring over multiple cycles as further described in reference to FIG. 8.

Figure 8:
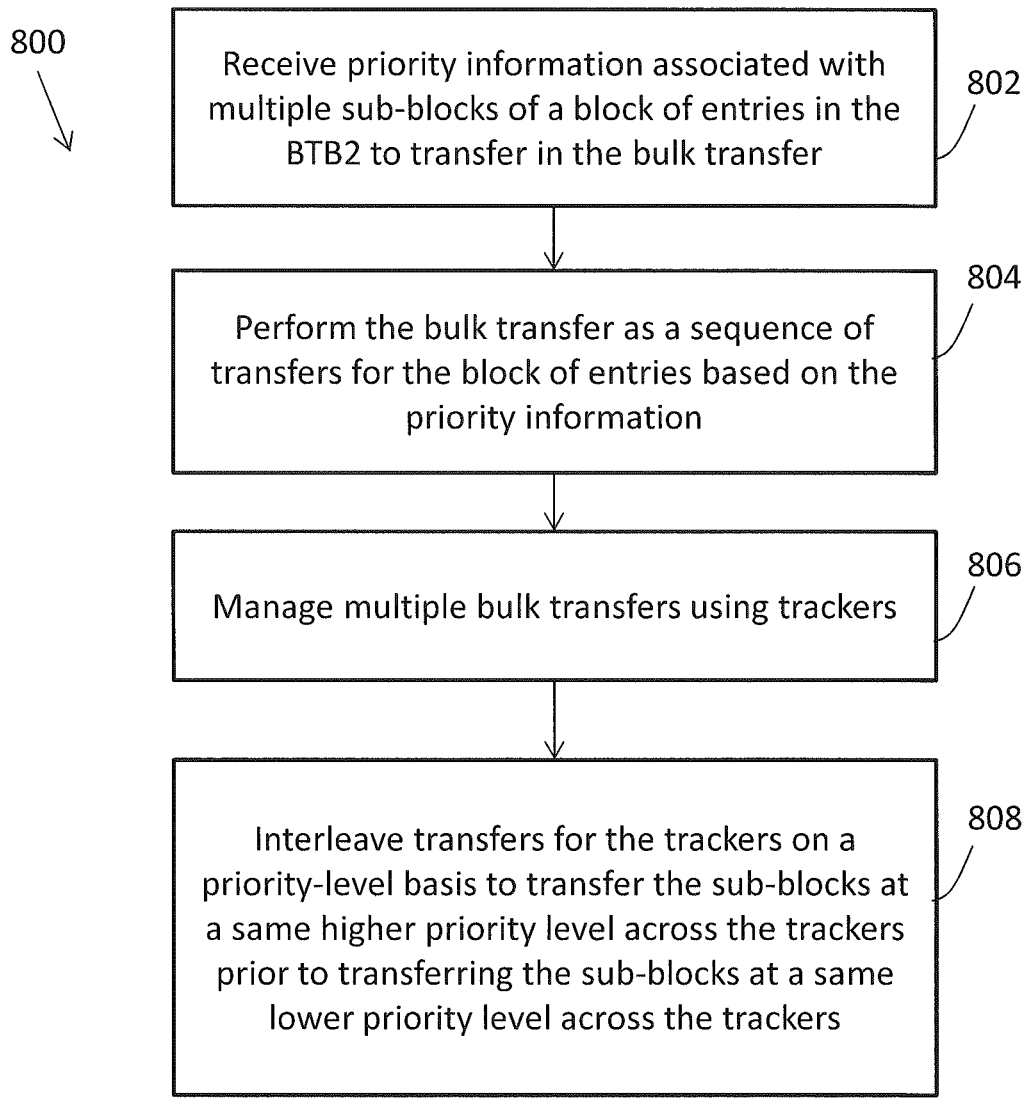
FIG. 8 is a flowchart illustrating a process for prioritized transfers from a second-level branch target buffer according to an embodiment.

Turning now to FIG. 8, a process 800 for prioritized transfers from a second-level branch target buffer will now be described in an exemplary embodiment. The process 800 is described in reference to FIGS. 1-7 and can be implemented by the branch predictor 118 of FIG. 2 and/or the branch predictor 118' of FIG. 4.

At block 802, priority information associated with multiple sub-blocks of a block of entries in the BTB2 206 is received to transfer in the bulk transfer of block 708 of process 700 in FIG. 7. Priority information can be managed using trackers 214 based on the HLULB 216. Prioritization can be established through the branch prediction and eviction logic 202, 402 to determine an order of transfers of half lines as sub-blocks from quartiles as segments of a page or block identified by the trackers 214.

At block 804, the bulk transfer from the BTB2 206 is performed as a sequence of transfers for the block of entries based on the priority information. In one example of prioritization, the block of entries is divided into segments of sub-blocks (e.g., quartiles of half lines). A demand sub-block that initiated the secondary search (e.g., confirmed BTB miss) is transferred with the highest priority. Referenced sub-blocks in a same segment as the demand sub-block are transferred with a second highest priority. Referenced sub-blocks in other segments of the block are transferred with a third highest priority. Sub-blocks with no available reference information are transferred with a fourth highest priority. Unreferenced sub-blocks may be transferred with a lowest priority or not transferred at all.

In another example of prioritization including 6 priority levels, a demand sub-block that initiated the secondary search is transferred with a highest priority. Referenced sub-blocks in a same segment as the demand sub-block are transferred with a second highest priority. Referenced sub-blocks in referenced segments of the block are transferred with a third highest priority. Referenced sub-blocks in unreferenced segments of the block are transferred with a fourth highest priority. Sub-blocks with no available reference information are transferred with a fifth highest priority. Unreferenced sub-blocks may be transferred with a lowest priority or not transferred at all. Additionally, higher prioritized BTB2 206 transfers may replace BTBP 208 or BTB1 204 entries having a lower priority.

At block 806, multiple bulk transfers are managed using trackers 214, such as the example of FIG. 6, where the priority information is associated with a plurality of priority levels. At block 808, transfers for the trackers 214 are interleaved on a priority-level basis to transfer the sub-blocks at a same higher priority level across the trackers 214 prior to transferring the sub-blocks at a same lower priority level across the trackers 214. For example, tracker 602 and tracker 604 sub-blocks (half lines) HL1-HL4 are transferred in the second highest priority level 612 before transfers from either tracker 602 or tracker 604 are performed at the third highest priority level 614.

Figure 9:
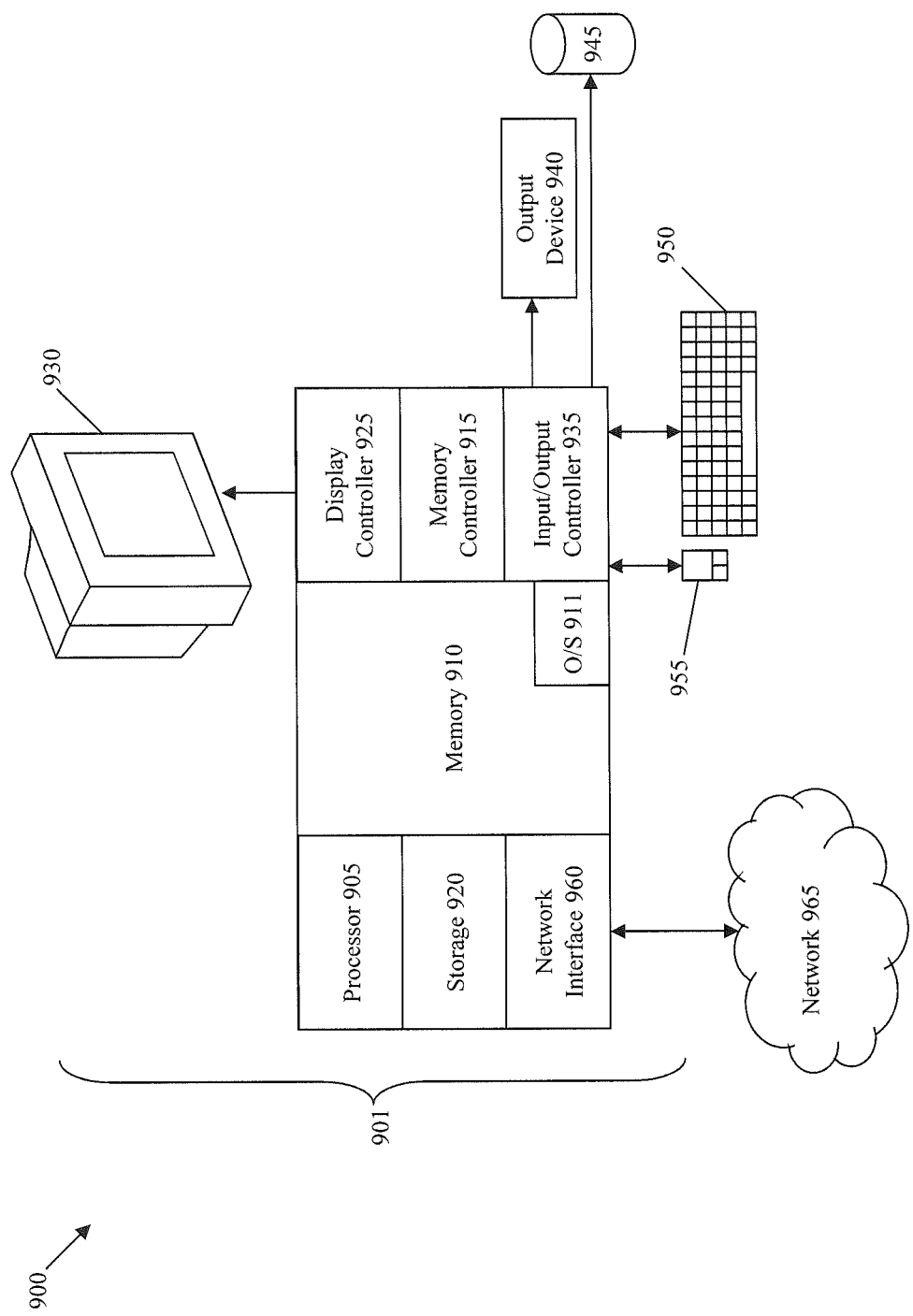
FIG. 9 depicts a computing system according to an embodiment.

FIG. 9 depicts a block diagram of a system 900 for asynchronous lookahead hierarchical branch prediction using a second-level branch target buffer in a processor 905. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 900 therefore includes general-purpose computer 901 as illustrated in FIG. 9.

In an exemplary embodiment, in terms of hardware architecture, as shown in FIG. 9, the computer 901 includes a processor 905 which is a processing circuit that includes the processing pipeline 106 of FIG. 1 and a branch predictor 118, 118'. The computer 901 further includes memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In an exemplary embodiment, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930. In an exemplary embodiment, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to fetch and execute instructions stored within the memory 910, to communicate data to and from the memory 910, and to generally control operations of the computer 901 pursuant to the instructions.

In an exemplary embodiment, where the branch predictor 118, 118' of FIGS. 2 and 4 is implemented in hardware, the methods described herein, such as processes 700 and 800 of FIGS. 7 and 8, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
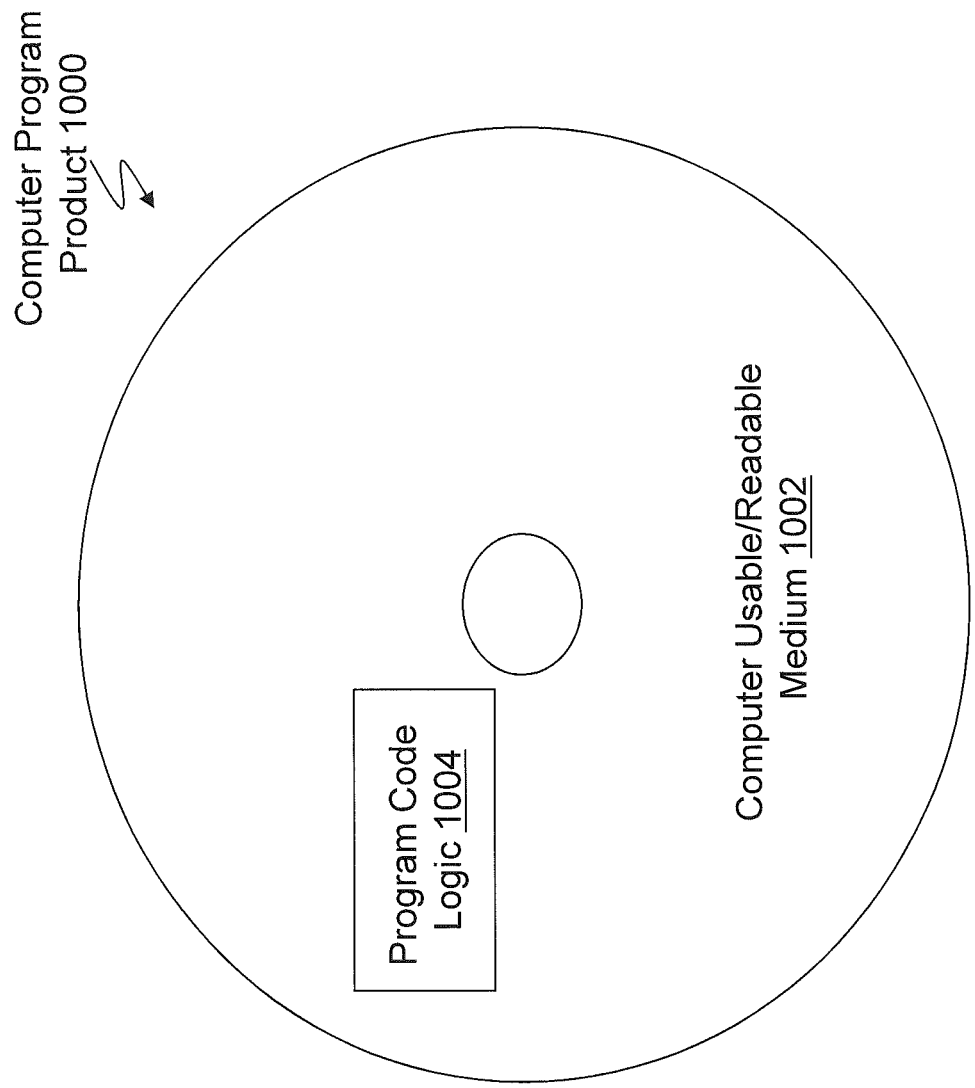
FIG. 10 depicts a computer-readable medium according to an embodiment.

Referring now to FIG. 10, in one example, a computer program product 1000 includes, for instance, one or more storage media 1002, wherein the media may be tangible and/or non-transitory, to store computer readable program code means or logic 1004 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a system, method, and computer program product for asynchronous lookahead hierarchical branch prediction. The system includes a first-level branch target buffer and a second-level branch target buffer coupled to a processing circuit. The processing circuit is configured to perform a method. The method includes receiving a search request to locate branch prediction information associated with a search address, and searching for an entry corresponding to the search request in the first-level branch target buffer. Based on failing to locate a matching entry in the first-level branch target buffer corresponding to the search request, a secondary search is initiated to locate entries in the second-level branch target buffer having a memory region corresponding to the search request. Based on locating the entries in the second-level branch target buffer, a bulk transfer of the entries is performed from the second-level branch target buffer.

In an embodiment, initiating the secondary search is based on failing to locate the matching entry in the first-level branch target buffer for a predetermined number of searches since one or more of: a previous prediction, a surprise branch, and a restart.

In an embodiment, the processing circuit of the system is further configured to use a tracker to manage the secondary search and control the bulk transfer. The bulk transfer may return the entries from the second-level branch target buffer to one or more of: the first-level branch target buffer and a branch target buffer preload table. A recently completed search history can be maintained including a list of recently completed searches of the second-level branch target buffer.

In an embodiment, the processing circuit of the system is further configured to perform, prior to creating a new tracker for a new secondary search, checking the recently completed search history to confirm that the new secondary search does not match one of the recently completed searches. In an embodiment, the processing circuit of the system is further configured to perform, prior to creating the new tracker for the new secondary search, checking other trackers to confirm that the new secondary search does not match an active secondary search.

In an embodiment, the processing circuit of the system is further configured to receive priority information associated with multiple sub-blocks of a block of entries in the second-level branch target buffer to transfer in the bulk transfer, and to perform the bulk transfer as a sequence of transfers for the block of entries based on the priority information.

In an embodiment, the block of entries is divided into segments of sub-blocks, and the processing circuit is further configured to perform: transferring with a highest priority, a demand sub-block that initiated the secondary search; transferring with a second highest priority, referenced sub-blocks in a same segment as the demand sub-block; transferring with a third highest priority, referenced sub-blocks in other segments of the block; transferring with a fourth highest priority, sub-blocks with no available reference information; and transferring with a lowest priority, unreferenced sub-blocks.

In an embodiment, the block of entries is divided into segments of sub-blocks, and the processing circuit is further configured to perform: transferring with a highest priority, a demand sub-block that initiated the secondary search; transferring with a second highest priority, referenced sub-blocks in a same segment as the demand sub-block; transferring with a third highest priority, referenced sub-blocks in referenced segments of the block; transferring with a fourth highest priority, referenced sub-blocks in unreferenced segments of the block; transferring with a fifth highest priority, sub-blocks with no available reference information; and transferring with a lowest priority, unreferenced sub-blocks.

In an embodiment, the priority information is associated with a plurality of priority levels, and the processing circuit is further configured to manage multiple bulk transfers using trackers, and to interleave transfers for the trackers on a priority-level basis to transfer the sub-blocks at a same higher priority level across the trackers prior to transferring the sub-blocks at a same lower priority level across the trackers.

Technical effects and benefits include performing asynchronous lookahead hierarchical branch prediction using a second-level branch target buffer. Exemplary embodiments detect that the BTB1 may be lacking predictions and speculatively transfer branch prediction information from the BTB2 for a memory region that branch prediction is currently operating upon. As such, the BTB2 does not directly support the current prediction, as no direct path is included between the BTB2 and hit detection logic. Instead, the BTB2 provides branch prediction information to the BTBP or BTB1, which can then be used for hit detection. Transferring a block of BTB entries from the BTB2 to the BTBP or BTB1 may be performed asynchronously in a lookahead manner such that latency associated with the BTB2 does not directly impact branch prediction throughput of the hit detection logic. Using a priority scheme for selecting a transfer order of sub-blocks of a bulk transfer block can further improve branch prediction performance.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for asynchronous lookahead hierarchical branch prediction using a second-level branch target buffer, the system comprising:
   a first-level branch target buffer;
   a second-level branch target buffer;
   a lookaside buffer; and
   a branch prediction and eviction logic processing circuit coupled to the first-level branch target buffer, the second-level branch target buffer, and the lookaside buffer, the processing circuit configured to perform:
   receiving a search request to locate branch prediction information associated with a search address;
   searching, by the processing circuit, for an entry corresponding to the search request in the first-level branch target buffer;
   based on failing to locate a matching entry in the first-level branch target buffer corresponding to the search request, initiating, by the processing circuit, a secondary search to locate a plurality of entries in the second-level branch target buffer having a memory region corresponding to the search request;

determining priority information based on the lookaside buffer that tracks a program execution path indicating locations of the second-level branch target buffer referenced as executed code and indicating locations that were unreferenced as executed code during program execution in a plurality of sub-blocks of a block of entries in the second-level branch target buffer, wherein the lookaside buffer further tracks references between a plurality of segments of the block, wherein the segments group the sub-blocks, and further wherein the lookaside buffer indicates which of the segments were transitioned to and which of the segments of were not transitioned to by each of the segments of the block; and based on locating the entries in the second-level branch target buffer, performing the bulk transfer of the entries from the second-level branch target buffer to the first-level branch target buffer as a sequence of transfers for the block of entries based on the priority information as applied across the segments of the sub-blocks in transferring both the locations that were referenced and the locations were unreferenced from the block of the second-level branch target buffer.

2. The system of claim 1, wherein initiating the secondary search is based on failing to locate the matching entry in the first-level branch target buffer for a predetermined number of searches since one or more of: a previous prediction, a surprise branch, and a restart.

3. The system of claim 1, wherein the processing circuit is further configured to perform:
using a tracker to manage the secondary search and control the bulk transfer, wherein the bulk transfer returns the entries from the second-level branch target buffer to one or more of: the first-level branch target buffer and a branch target buffer preload table; and
maintaining a recently completed search history comprising a list of recently completed searches of the second-level branch target buffer.

4. The system of claim 3, wherein the processing circuit is further configured to perform:
prior to creating a new tracker for a new secondary search, checking the recently completed search history to confirm that the new secondary search does not match one of the recently completed searches; and
prior to creating the new tracker for the new secondary search, checking other trackers to confirm that the new secondary search does not match an active secondary search.

5. The system of claim 1, wherein the processing circuit is further configured to perform:
transferring with a highest priority, a demand sub-block that initiated the secondary search;
transferring with a second highest priority, referenced sub-blocks in a same segment as the demand sub-block;
transferring with a third highest priority, referenced sub-blocks in other segments of the block;
transferring with a fourth highest priority, sub-blocks with no available reference information; and
transferring with a lowest priority, unreferenced sub-blocks.

6. The system of claim 1, wherein the processing circuit is further configured to perform:
transferring with a highest priority, a demand sub-block that initiated the secondary search;
transferring with a second highest priority, referenced sub-blocks in a same segment as the demand sub-block;
transferring with a third highest priority, referenced sub-blocks in referenced segments of the block;
transferring with a fourth highest priority, referenced sub-blocks in unreferenced segments of the block;
transferring with a fifth highest priority, sub-blocks with no available reference information; and
transferring with a lowest priority, unreferenced sub-blocks.

7. The system of claim 1, wherein the priority information is associated with a plurality of priority levels, and the processing circuit is further configured to perform:
managing multiple bulk transfers using trackers; and
interleaving transfers for the trackers on a priority-level basis to transfer the sub-blocks at a same higher priority level across the trackers prior to transferring the sub-blocks at a same lower priority level across the trackers.

* * * * *